United States Patent
Banik et al.

(10) Patent No.: US 8,612,026 B2
(45) Date of Patent: Dec. 17, 2013

(54) METHOD AND DEVICE FOR PLANNING AN INDUSTRIAL AUTOMATION ARRANGEMENT

(75) Inventors: Thomas Banik, Erlangen (DE); Sven Kerschbaum, Erlangen (DE); Ronald Lange, Fürth (DE); Thomas Talanis, Heroldsbach (DE); Frank Volkmann, Nüremberg (DE)

(73) Assignee: Siemens Aktiengessellschaft, Munich (DE)

( * ) Notice: Subject to any disclaimer, the term of this patent is extended or adjusted under 35 U.S.C. 154(b) by 321 days.

(21) Appl. No.: 13/013,401

(22) Filed: Jan. 25, 2011

(65) Prior Publication Data

US 2011/0184543 A1 Jul. 28, 2011

(30) Foreign Application Priority Data

Jan. 25, 2010 (EP) .................... 10000731

(51) Int. Cl.
*G06F 19/00* (2011.01)
(52) U.S. Cl.
USPC ............... 700/17; 700/108; 700/83; 714/33
(58) Field of Classification Search
USPC ........ 700/17, 20, 97–99, 108, 44–45; 715/53; 714/33, 37
See application file for complete search history.

(56) References Cited

U.S. PATENT DOCUMENTS

| | | | | |
|---|---|---|---|---|
| 5,491,795 | A * | 2/1996 | Beaudet et al. | 715/804 |
| 6,281,896 | B1 * | 8/2001 | Alimpich et al. | 715/781 |
| 7,778,717 | B2 * | 8/2010 | Bachman et al. | 700/83 |
| 7,835,805 | B2 * | 11/2010 | Hood et al. | 700/20 |
| 8,010,939 | B2 * | 8/2011 | Melzer et al. | 717/105 |
| 8,185,219 | B2 * | 5/2012 | Gilbert et al. | 700/83 |
| 2003/0220707 | A1 * | 11/2003 | Budinger et al. | 700/97 |
| 2003/0236576 | A1 * | 12/2003 | Resnick et al. | 700/9 |

FOREIGN PATENT DOCUMENTS

| | | |
|---|---|---|
| DE | 19639424 A1 | 3/1997 |
| EP | 0401975 A2 | 12/1990 |
| EP | 0582536 A1 | 2/1994 |

OTHER PUBLICATIONS

Kurlander D et al: "A History-Based Macro by Example System" UIST '92. 5th Annual Symposium on User Interface Software and Technology. Proceedings of the ACM Symposium on User Interface Software and Technology. Monterey, Nov. 15-18, 1992; [ACM Symposium on User Interface Software and Technology], New York, N, Nov. 15, 1992, Seiten 99-106, XP000337555 ISBN: 978-0-89791-549-6 * das ganze Dokument *; Others; 1992; US.

Ingo Wassink et al: "Designing Workflows on the Fly Using E-Bioflow" Nov. 24, 2009, Service-Oriented Computing, Springer Berlin Heidelberg, Berlin, Heidelberg, pp. 470-484 , XP019134582, ISBN: 9783642103827 * das ganze Dokument *; Others; 2009; DE.

* cited by examiner

*Primary Examiner* — Kidest Bahta
(74) *Attorney, Agent, or Firm* — Cozen O'Connor

(57) ABSTRACT

A method and a device for planning an industrial automation arrangement, where an object model is generated from data objects, which represent automation components, and from relationships between these objects, a sequence of control actions by a user is used to select the objects from an object library and to relate them to one another. A plurality of sequences of control actions and their respective effects on the object model are stored as respective entity control trees with control steps, where at least two of the entity control trees are selected and used to generate a generalized type control tree using a first comparison, and the type of control tree is used to automatically plan the industrial automation arrangement.

8 Claims, 3 Drawing Sheets

METHOD AND DEVICE FOR PLANNING AN INDUSTRIAL AUTOMATION ARRANGEMENT

BACKGROUND OF THE INVENTION

1. Field of the Invention

The invention relates to computer aided design and, more particularly, to a method for planning an industrial automation arrangement and to a device for planning an industrial automation arrangement.

2. Description of the Related Art

Industrial automation arrangements consist, on the one hand, of hardware, i.e., active and passive electrical and electronic components and, on the other hand, software or a multiplicity of computer programs which are executed by the active components of the industrial automation arrangement. The hardware of the automation arrangement is generally assembled and "connected" by users in an interactive process at screen-assisted workstations. This process is also referred to as "engineering" or frequently as "planning". Here, graphical objects representing the components of the automation arrangement are often selected from component libraries, are arranged on a desktop and are related to one another. The software can also be produced in a similar manner using "graphical programming", also often referred to as "planning". Here, it is generally customary practice, during planning, for a user to determine the form of hardware configuration and the software architecture using a sequence of control actions on a graphical user interface (GUI). Here, the control actions (inputs) have an effect on an object model in which the objects represent the automation hardware components and/or software components and their relationships to one another.

This object model is a data representation of the hardware and software, and is generally stored in the memory area of a computer or planning workstation.

When creating or planning automation systems, it is often the case that particular groups of components have to be newly generated again and again, after which they are then individualized. For example, a combination of a particular computer unit (CPU) and other subassemblies is installed again and again in one or more automation arrangements but individual discrepancies may occur, such as the use of a different type of CPU. In order to exonerate a user of a planning workstation from repeatedly planning the same or similar subassemblies, groups of components or software modules, different aids are known. For example, groups of objects (such as components) and their relationships to one another may be combined with one another to form "function blocks" and may be stored in a library, with the result that they can be used again and again as modules. The disadvantage of this, inter alia, is that such libraries may be very extensive, with the result that it is difficult to maintain or gain an overview of the existing modules and it is difficult to subsequently perform the necessary individualization operations. Another possibility is to record sequences of control actions using "macro recorders", each user input, such as the clicking of a button or a text input, being logged, and such a "macro" being able to be "played" again as often as desired. As a result, the repeated input of control sequences can be avoided. However, these "macros" are suitable only when exactly the same prerequisites ("starting state") with regard to the user interface used are present, with the result that they regularly cannot be used in an expedient manner in the context of the planning of complex industrial automation arrangements.

All of this results in conventional planning processes having to be newly performed in further parts for every combination (entity) of an automation arrangement. Consequently, the hardware configuration, and often also the software configuration, frequently consists of a large number of very similar steps which nevertheless often have to be repeatedly performed in the same manner or in a similar manner by a user (automation engineer).

SUMMARY OF THE INVENTION

It is therefore an object of the present invention to simplify the planning of industrial automation arrangements and, in the process, to simplify, in particular, the repeated planning of identical and similar arrangements or partial arrangements.

This and other objects and advantages are achieved in accordance with the present invention by logging (i.e., storing) sequences of control actions and, in particular, their respective effects on the planned automation arrangement in the form of "control trees". This is based on the idea of being able to imagine the structure of a graphical user interface (GUI) and the commands contained in the GUI as nodes. The nodes are connected by lines when controlled ("run through") in a particular order, thus resulting in a diagram in the shape of a hierarchical tree. After a particular control action, only particular next control actions, from which the user can select one action, can be expediently performed on a graphical user interface. Here, each of these selectable possibilities leads to a different control tree. When the same control tree is run through twice, the same result is also generally achieved twice. Here, a fundamental concept of the present invention is to store the control trees which are run through when planning an industrial automation arrangement or part of the industrial automation arrangement, the control actions not being considered in an isolated manner in the sense of a "macro recorder" to be inputs on the graphical user interface but rather their effect on the object model, which represents the industrial automation arrangement, also being stored together with the underlying command. The fact that a plurality of control elements are respectively available for many functions or commands in modern graphical user interfaces is thus taken into account. If similar or similar parts of the automation arrangements are now planned several times, a "type control tree" can be determined in a generalized ("generic") form by comparing the control trees which are run through in the process, with the result that those control steps or necessary control actions which are always the same can be performed in an automated manner. In addition, only those control steps which are different in the control trees under consideration or lead to different results require a user input.

Another concept central to the present invention is that, in the case of the control steps which require user interaction, only those alternatives which are also expedient at the respective location are offered. On the one hand, these may be the alternatives which have already been used in the different control trees under consideration. On the other hand, an entire group of alternatives may also be derived from the control actions used there. Here, another concept central to the invention is that these alternatives can be obtained from a set of automatically generated control trees, these automatically generated control trees being able to be generated by an aid which automatically carries out a large number of or all permutations when controlling a graphical user interface. A file containing additional information in the sense of a "scenario" or "use case" for the necessary inputs can advantageously be provided for this purpose. In short, an analysis of a workflow is used to generate new entities of automation projects or automation subprojects.

The object is achieved, in particular, by a method for planning an industrial automation arrangement, where an object model is generated from data objects, which represent automation components, and from relationships between these objects, and a sequence of control actions by a user is used to select the objects from an object library and to relate them to one another. A plurality of sequences of control actions and their respective effects on the object model are stored as respective entity control trees, where at least two of the entity control trees is selected and used to generate a generalized type control tree using a first comparison, and the type control tree is used to automatically plan the industrial automation arrangement. In the case of those control steps of the type of control tree in which the corresponding control steps and/or their respective effects on the respective object model of the entity control trees used for the comparison do not match one another, a user query is intended to be effected to specify this control step of the type control tree. As a result, the user is given the opportunity to generate action steps which have been performed and differ only in variants as an "instruction chain with user interaction". Here, this generation of type models is performed automatically to the greatest possible extent by the comparison. Such a type model as a type control tree can then be used to easily create any desired new entities of this type. Workflows which are frequently required are at least partially automated thereby and save a user time and, in the process, minimize errors which can often occur when repeatedly performing similar activities.

The object is also achieved by a device for performing the method, where a graphical user interface for selecting and relating data objects based on symbols which represent automation objects is provided. Here, the device has an acquisition device for logging control steps and for logging the effects on an object model of the industrial automation arrangement which are associated with these control steps, as well as a memory device for storing a multiplicity of control trees which represent the control steps and their effects, and a type generator for generating type control trees from a plurality of sequences of these logged control steps. Such a device can be used to achieve the advantages of the method in accordance with the invention.

After the control step has been specified, the resultant sequence of control steps is advantageously compared with a plurality of the stored entity control trees using second comparisons. It is thus possible to determine whether the resultant entity control tree is part of an already existing control tree or has a partial match ("similarity") with one of the stored entity control trees. As a result, this existing control tree can be used for the automated continuation of the planning process. Here, that entity control tree of the stored entity control trees which has the greatest possible match with the sequence of previous control steps which results from the specifying process can be used to continue the automatic planning process. Alternatively or additionally, a number of the entity control trees found during the second comparisons can be indicated to the user for selection in a new dialog, where the user can select the automated or partially automated continuation of the planning process in this dialog. Here, the entity control trees with a good match are preferably displayed; sorting criteria can be actively predefined.

The larger the database with the stored control trees, the higher the likelihood of being able to find a suitable entity control tree which can be used for the automated or partially automated planning process or the continuation of the latter. For this purpose, automated control of GUI elements of a graphical user interface of planning software can be used to determine a number of general control trees, these general control trees being stored and used as further entity control trees. Information which is relevant to automated control can be stored in advance for the automated control of such GUI elements. For example, inputs which can be entered in text or value fields can be stored in XML files or in other formats to control a user dialog of the user interface. Furthermore, error messages and other outputs of the graphical user interface can be evaluated to filter out those control trees which lead to erroneous or nonsensical results. The stored control trees (i.e., general control trees) are thus restricted to those variants which may lead to desired results. The general control trees can be used as stored entity control trees.

The user query for the specifying process advantageously provides the user with a number of control possibilities for selection in a selection dialog, which number of control possibilities generalize the control steps identified as different in the entity control trees compared in the first comparison. For example, those control steps which relate to a first object of an object class in a first case and relate to a second object of this object class in a second control tree can be generalized such that all objects of this object class are provided for selection in the associated dialog of the user query.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings illustrate an exemplary embodiment of a planning device according to the invention, in which.

DETAILED DESCRIPTION OF THE PRESENTLY PREFERRED EMBODIMENTS

Figure 1:
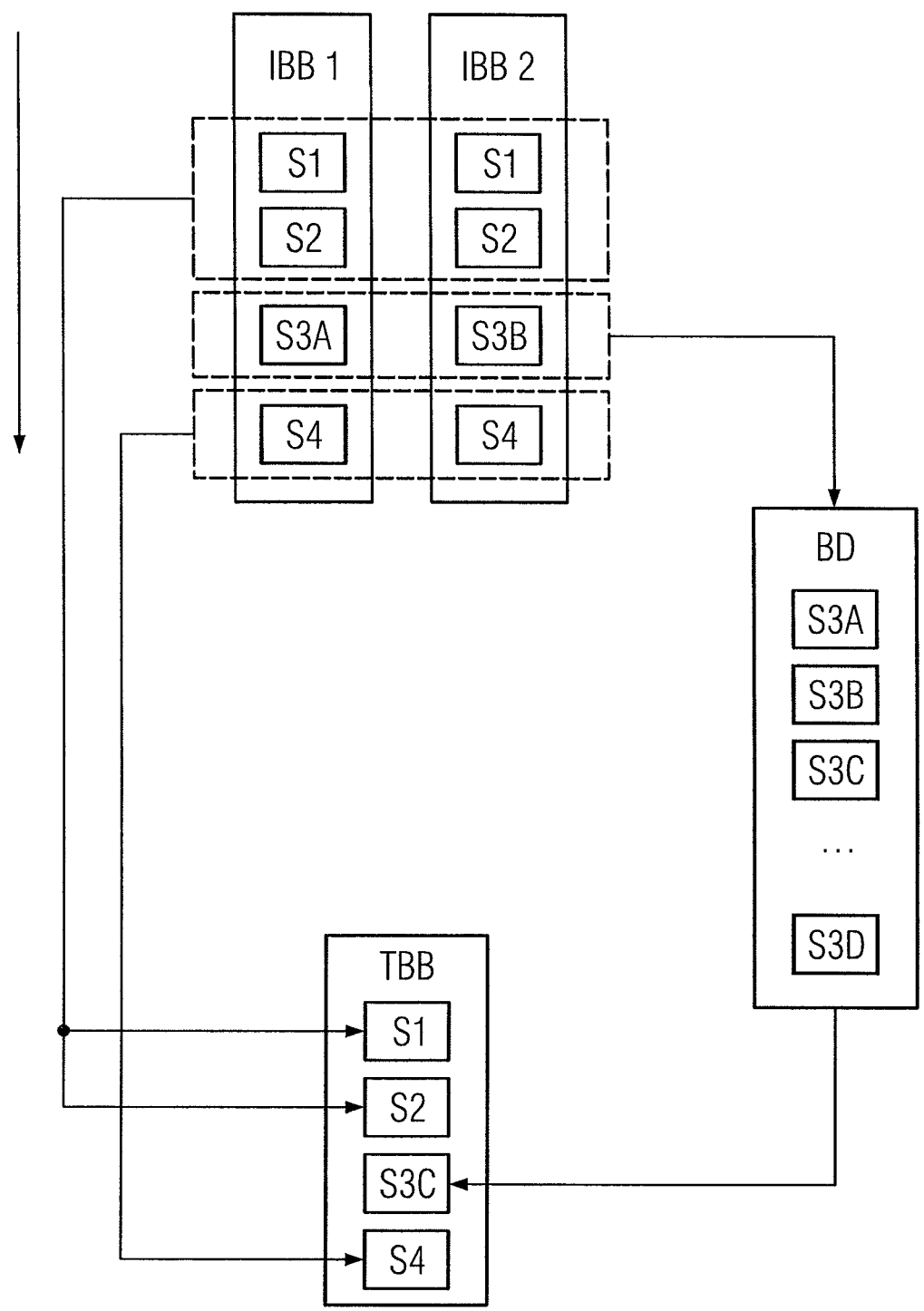
FIG. 1 diagrammatically shows a comparison of two control trees and a resultant generation of a type control tree with a control step for a user query.

FIG. 1 diagrammatically shows a simplified case for planning a hardware arrangement for an industrial automation arrangement. The control steps S1, S2, S3A, S3B, S4 shown in this case are the result of a corresponding sequence of control actions performed by a user on a graphical user interface ("planning tool"). Here, the arrow on the left-hand edge of the figure represents the temporal sequence of control steps. Alternatively, a logical sequence can also be considered. Here, the control steps S1, S2, S3A, S3B, S4 shown primarily represent effects on an object model of the industrial automation arrangement and are therefore independent of the specific user action. Consequently, it is insignificant, for example, whether the control step S1 was produced by operating a pull-down menu, by importing a file or by another control action.

With continued reference to FIG. 1, illustrated therein are two entity control trees IBB1, IBB2 as the result of two planning processes, which trees are each stored in a memory of the planning workstation and were generated, for example, at different times and even in different projects, for example. A plurality of the stored entity control trees IBB1, IBB2 (only two entity control trees IBB1, IBB2 are illustrated in the exemplary embodiment for reasons of clarity) are selected by a command from a user and are supplied to an automated comparison. The aim is to generate a further industrial automation arrangement, i.e., a new entity, based on the present "experience" in the form of the stored entity control trees IBB1, IBB2. The automated planning device used for this purpose determines that the entity control trees IBB1, IBB2 selected match in the first two control steps S1, S2 under consideration. This results in the type control tree TBB, which represents the new industrial automation arrangement (new entity), being provided with the matching control steps S1, S2. This step can be performed without user action.

However, the third control steps S3A, S3B differ in the two entity control trees IBB1, IBB2 under consideration. A user, i.e., the planner, is therefore presented with a user dialog BD for a user query, the two control steps S3A, S3B from the entity control trees IBB1, IBB2 compared first of all being displayed once there and being provided for selection. The new control tree TBB thus includes a control step that results in a user enquiry being output. It is now assumed that the control step S3A is the addition of a CPU of type A and the control step S3B is the addition of a CPU of type B. The common feature of these two control steps is thus that a component of the class "CPU" is added and is connected to other components (e.g., from the control steps S1, S2). For this reason, the planning device extends the user dialog BD by further components from the corresponding class "CPU" of a stored component catalog. In the example in the figure, these are control steps S3C, S3D that involve adding CPUs of type C and type D.

In the example illustrated, it is now also assumed that, in the user dialog BD and the user query implemented in the latter, the user specifically opts for the control step S3C. As a result, the corresponding control step of the type control tree is specified. The subsequent control step S4 in the two entity control trees IBB1, IBB2 under consideration is the same again. Consequently, this control step S4 can be adopted into the type control tree TBB without a user query.

In one advantageous embodiment of the invention, a continuous comparison with stored entity control trees IBB1, IBB2 is performed when manually planning the type control tree TBB. In the present exemplary embodiment, this means that, after the control step S1 has been manually input, the control step S2 is automatically predefined since the control step S2 always follows the control step S1 in all stored entity control trees IBB1, IBB2. If, unlike the illustration in the figure, the control step S3A is input by a user action as a third control step after the second control step, this "online comparison" learns that an automation arrangement is obviously intended to be planned according to the model of the entity control tree IBB1. As a result, the subsequent control step S4 from the entity control tree IBB1 is predefined or automatically inserted.

In another advantageous embodiments of the invention, general control trees are automatically determined and used for the comparison and, thus, for the automated planning process in the same manner as the entity control trees. Here, the general control trees are generated by automated control of the user interface of the planning tool. As an example, it is assumed that the user interface of the planning tool is structured such that, after a CPU has been planned, an appropriate power supply must be necessarily added to the project as the next step (e.g., a control step). In such a case, all general control trees in which the addition of a CPU was selected as a control step would necessarily show the addition of a power supply as the next control step. If a user now plans a corresponding CPU in his project, the comparison device would find all control trees, i.e., both the entity control trees and the general control trees used in the same manner, in which a control step that describes the addition of this CPU occurs. The common feature of all control trees found in this case would be that a further control step which contains the addition of the appropriate power supply is carried out thereafter. This control step can then be automatically predefined by the system.

Figure 2:
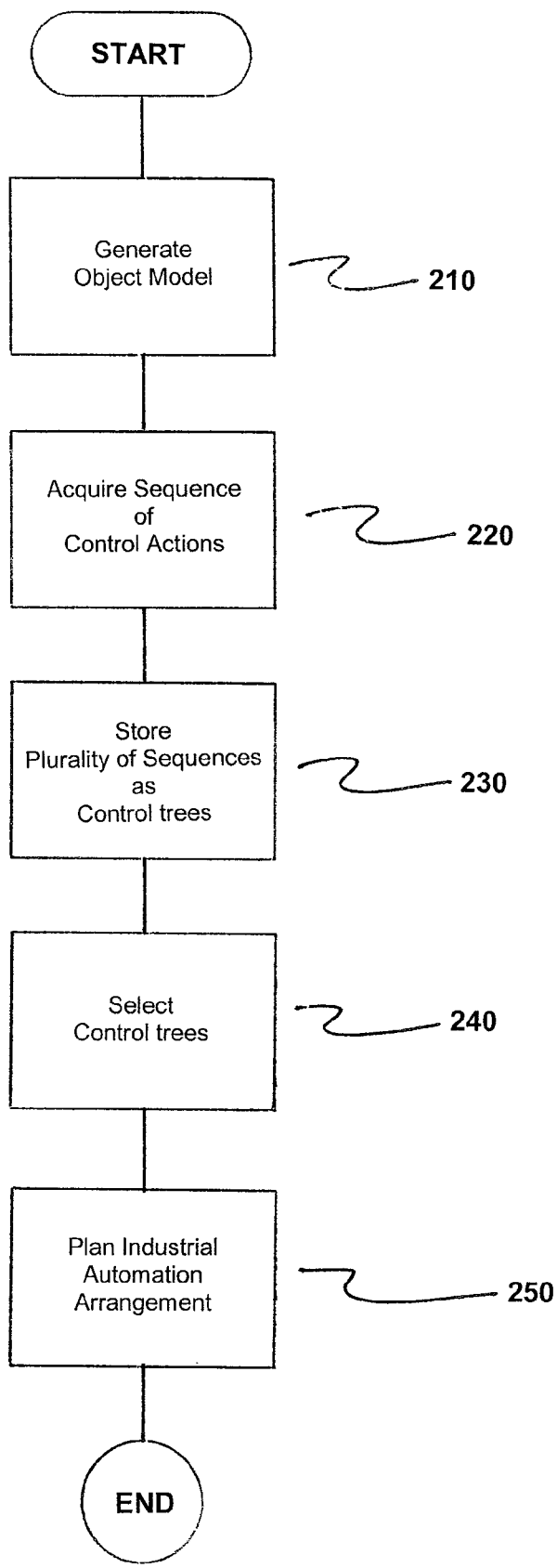
FIG. 2 is a flow chart of a method in accordance with an embodiment of the invention.

FIG. 2 is a flow chart of a method for planning an industrial automation arrangement. The method comprises generating an object model from data objects, which represent automation components, and from relationships between these objects, as indicated in step 210.

A sequence of control actions is acquired by a user to select the objects from an object library and to relate the selected objects to one another, as indicated in step 220. A plurality of sequences of control actions and associated respective effects on the object model is stored as respective entity control trees with control steps, as indicated in step 230.

At least two of the entity control trees is selected and a generalized type control tree is generated using a first comparison based of the at least two of the entity control trees, as indicated in step 240. The industrial automation arrangement is automatically planned based on the generalized type control tree, as indicated in step 250. In a case of those control steps of the type control tree in which the corresponding control steps and/or their respective effects on the respective object model of the entity control trees used for the first comparison do not match one another, a user query is effected to specify a control step of the type control tree.

Figure 3:
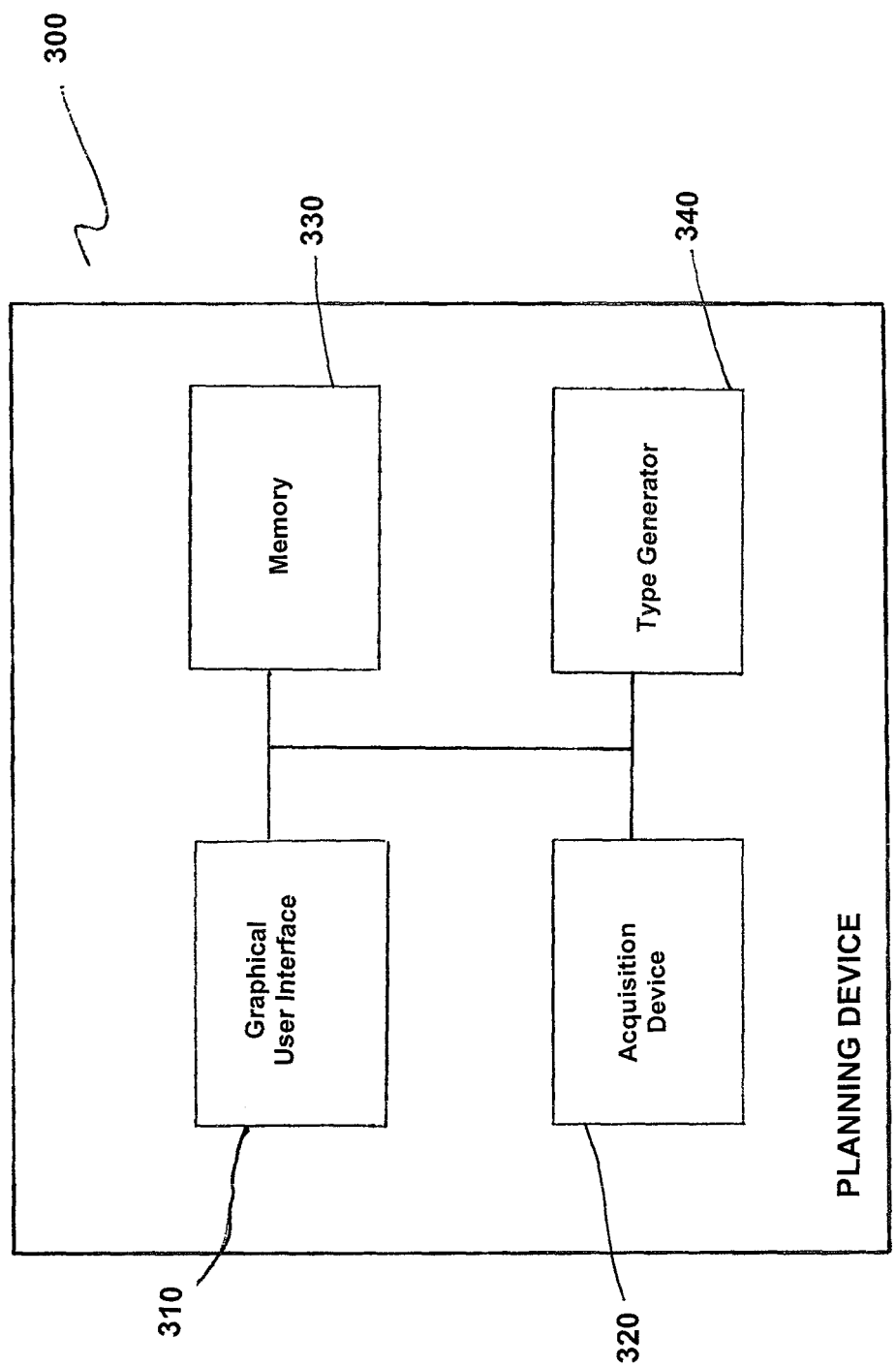
FIG. 3 is schematic block diagram that shows a device for planning an industrial arrangement in accordance with an embodiment of the invention.

FIG. 3 is schematic block diagram that shows a device 300 for planning an industrial arrangement in accordance with an embodiment of the invention. With specific reference to FIG. 3, the device includes a graphical user interface 310 for selecting and relating data objects based on symbols representing automation objects. The device 300 also includes an acquisition device 320 that is configured to log control steps and to log effects on an object model of the industrial automation arrangement that are associated with the control steps.

A memory device 330 is provided for storing a plurality of control trees representing the control steps and effects of the plurality of control trees. In addition, the device 300 includes a type generator 340 that is configured to generate type control trees from a plurality of sequences of logged control steps.

In accordance with the contemplated embodiments, the device 300 is configured to acquire a sequence of control actions by a user to select the objects from an object library and to relate the selected objects to one another, store a plurality of sequences of control actions and associated respective effects on the object model as respective entity control trees with control steps, select at least two of the entity control trees and generate a generalized type control tree using a first comparison based of the at least two of the entity control trees; and automatically plan the industrial automation arrangement based on the generalized type control tree.

The device 300 is additionally configured to, in a case of those control steps of the type control tree in which the corresponding control steps and/or their respective effects on the respective object model of the entity control trees used for the first comparison do not match one another, receive a user query to specify a control step of the type control tree.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer implemented method for planning an industrial automation arrangement, comprising:
   generating, by a processor of the computer, an object model from data objects, which represent automation components, and from relationships between these objects;
   acquiring a sequence of control actions by a user and using the acquired sequence of control actions to select, by the processor, the objects from an object library and to relate the selected objects to one another;
   storing, in a memory, a plurality of sequences of control actions and associated respective effects on the object model as respective entity control trees with control steps;
   selecting, by the processor, at least two of the entity control trees and generating a generalized type of control tree using a first comparison based on the at least two of the entity control trees; and
   automatically planning the industrial automation arrangement based on the generalized type of control tree;
   wherein, in a case of a particular control step of those control steps of the generalized type of control tree in which at least one of corresponding control steps and respective effects of the control steps on a respective object model of the entity control trees used for the first comparison do not match one another, a user query is effected to specify the particular control step of the generalized type of control tree.

2. The method as claimed in patent claim 1, wherein, after specifying the particular control step, a resultant sequence of control steps is compared with a plurality of the stored respective entity control trees using second comparisons.

3. The method as claimed in patent claim 2, wherein that entity control tree of the stored respective entity control trees which has a greatest possible match with the resultant sequence of control steps which results from a specifying process is used to continue an automatic planning process.

4. The method as claimed in patent claim 2, wherein a number of the respective entity control trees found during the second comparisons are indicated to the user for selection in a dialog, one of the respective entity control trees, which is selected by the user, being used to continue the automatic planning process.

5. The method as claimed in patent claim 3, wherein a number of the respective entity control trees found during the second comparisons are indicated to the user for selection in a dialog, one of the respective entity control trees, which is selected by the user, being used to continue the automatic planning process.

6. The method as claimed in claim 1, wherein a number of general control trees are determined by automated control of graphical under interface elements of a GUI of planning software, the number of general control trees being stored as further entity control trees.

7. The method as claimed in claim 1, wherein the user query provides the user with a number of control options for selection in a selection dialog, the number of control options generalizing the resultant sequence of control steps identified as different in the entity control trees compared in the first comparison.

8. A device for planning an industrial automation arrangement, comprising:
   a graphical user interface for selecting and relating data objects based on symbols representing automation objects;
   an acquisition device configured to log control steps and to log effects on an object model of the industrial automation arrangement which are associated with the control steps;
   a memory device for storing a plurality of control trees representing the control steps and effects of the plurality of control trees on the object model; and
   a type generator configured to generate types of control trees from a plurality of sequences of logged control steps;
   wherein the device is configured to:
     acquire, by the acquisition device, a sequence of control actions by a user to select the objects from an object library and to relate the selected objects to one another;
     store, in the memory device, a plurality of sequences of control actions and associated respective effects on the object model as respective entity control trees with control steps;
     select at least two of the entity control trees and generate a generalized type of control tree using a first comparison based of the at least two of the entity control trees; and
     automatically plan the industrial automation arrangement based on the generalized type control tree;
   wherein the device is further configured to, in a case of a particular control step of those control steps of the generalized type of control tree in which at least one of corresponding control steps and respective effects of the control steps on the respective object model of the entity control trees used for the first comparison do not match one another, effect a user query to specify the particular control step of the generalized type of control tree.

* * * * *